United States Patent
Birsan et al.

(10) Patent No.: US 7,661,031 B2
(45) Date of Patent: Feb. 9, 2010

(54) CORRELATING MACRO AND ERROR DATA FOR DEBUGGING PROGRAM ERROR EVENT

(75) Inventors: Valentina Birsan, Toronto (CA); Dorian Birsan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/617,090

(22) Filed: Dec. 28, 2006

(65) Prior Publication Data
US 2008/0163223 A1    Jul. 3, 2008

(51) Int. Cl.
*G06F 11/00* (2006.01)
(52) U.S. Cl. .......................... 714/38; 717/124
(58) Field of Classification Search ........................ None
See application file for complete search history.

(56) References Cited

U.S. PATENT DOCUMENTS

| | | | |
|---|---|---|---|
| 5,047,977 A * | 9/1991 | Hill et al. ....................... 714/57 |
| 5,347,649 A * | 9/1994 | Alderson .................... 719/312 |
| 5,590,056 A | 12/1996 | Barritz |
| 5,619,644 A * | 4/1997 | Crockett et al. ............... 714/45 |
| 5,682,328 A | 10/1997 | Roeber et al. |
| 5,859,963 A * | 1/1999 | O'Dowd et al. ............... 714/38 |
| 6,154,849 A * | 11/2000 | Xia ............................. 714/4 |
| 6,701,464 B2 | 3/2004 | Austen et al. |
| 6,708,291 B1 | 3/2004 | Kidder |
| 6,845,471 B1 | 1/2005 | Huth |
| 7,216,336 B1 * | 5/2007 | Ezra et al. .................... 717/124 |
| 7,284,153 B2 * | 10/2007 | Okbay et al. .................. 714/30 |
| 7,500,152 B2 * | 3/2009 | Moyer et al. .................. 714/45 |
| 2003/0074607 A1 | 4/2003 | Brundridge et al. |
| 2004/0123184 A1 * | 6/2004 | Westberg ..................... 714/38 |
| 2004/0199828 A1 | 10/2004 | Cabezas et al. |
| 2005/0138479 A1 | 6/2005 | Awada et al. |
| 2005/0149750 A1 | 7/2005 | Lisanke et al. |
| 2005/0183066 A1 * | 8/2005 | Jabori ......................... 717/124 |
| 2006/0048101 A1 * | 3/2006 | Krassovsky et al. .......... 717/127 |
| 2007/0168968 A1 * | 7/2007 | Bates et al. .................. 717/124 |
| 2008/0004841 A1 * | 1/2008 | Nakamura ................... 702/186 |
| 2008/0109675 A1 * | 5/2008 | Deng et al. ..................... 714/2 |
| 2009/0070639 A1 * | 3/2009 | Langford et al. .............. 714/57 |

FOREIGN PATENT DOCUMENTS

JP    2005122409    12/2005

OTHER PUBLICATIONS

Cox et al., "Input/Output Event Analysis," IBM Technical Disclosure Bulletin, vol. 40, No. 7, Jul. 1997, pp. 117-128.
Unknown, "Strategy for handling recoverable errors using event logs—using three classes of error including class two which is recorded in both event log and at system console," Research Disclosure No. 0335046 (Abstract Only), Feb. 20, 1992.
Clark et al., "Useability Measuring Tool," IBM Technical Disclosure Bulletin, No. 5, Oct. 1991, pp. 284-285.

* cited by examiner

*Primary Examiner*—Christopher S McCarthy
(74) *Attorney, Agent, or Firm*—Daniel McLoughlin; Hoffman Warnick

(57) ABSTRACT

A solution for managing a program execution is provided. During execution of a program, macro data and error data can be generated and stored. The macro data includes a set of execution entries, each of which includes data for a user interface task for a user interface object and a time for the user interface task. The error data, if any, includes a set of failure entries, each of which includes data for an error event and a time for the error event. A failure entry can be subsequently correlated with at least one execution entry based on the corresponding times. Further, relationship data and/or the like can be used to generate a test case, which can enable the user interface tasks that led up to the error event to be recreated.

20 Claims, 4 Drawing Sheets

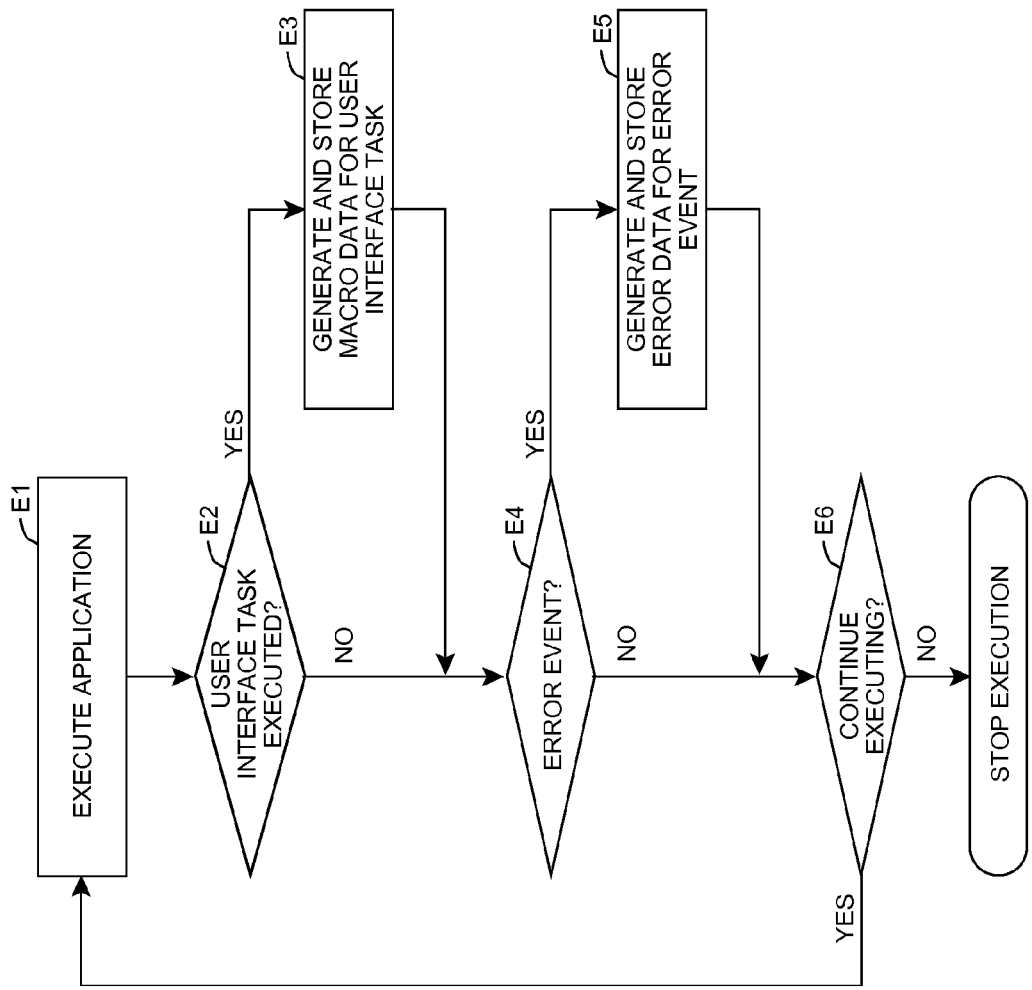

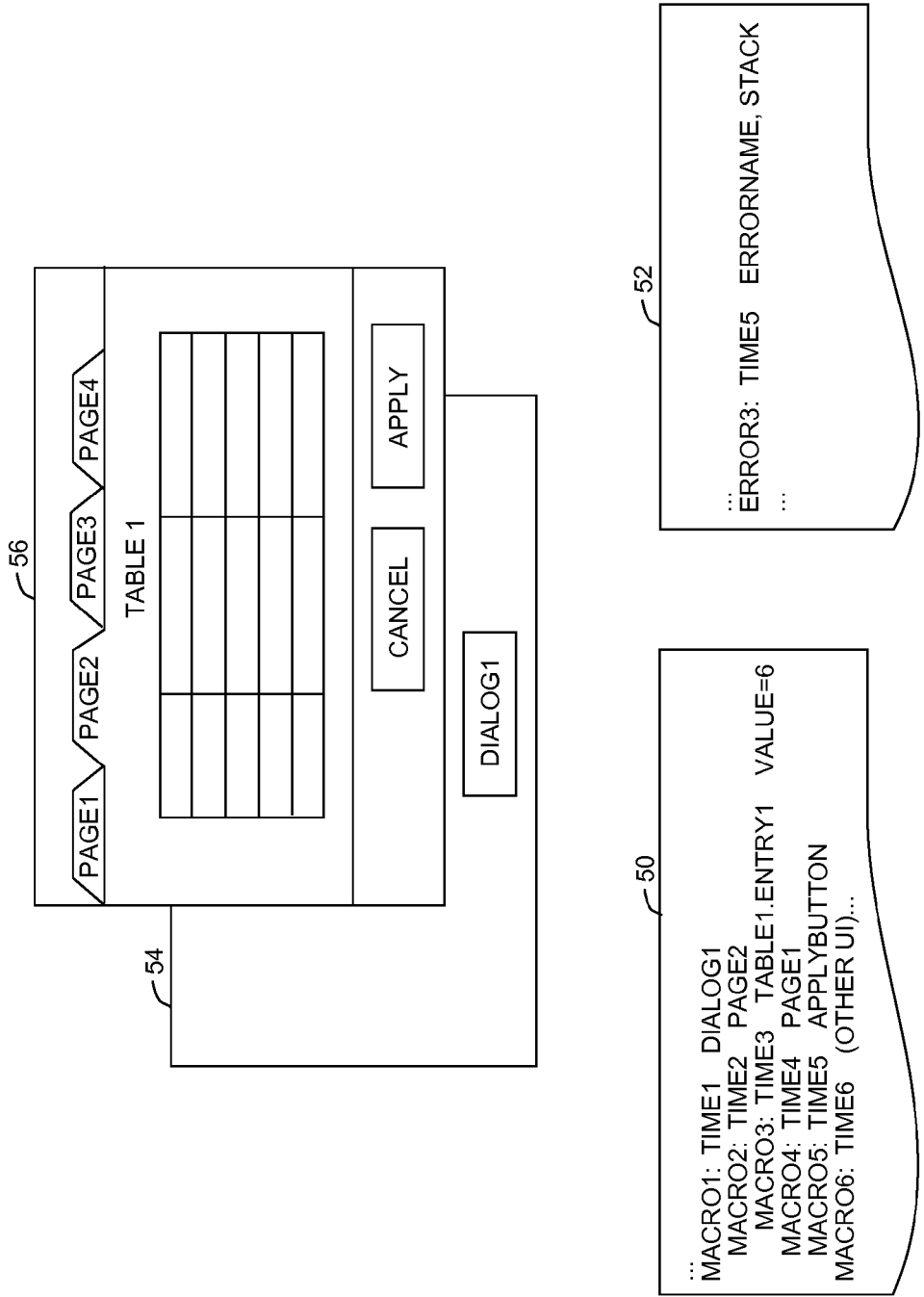

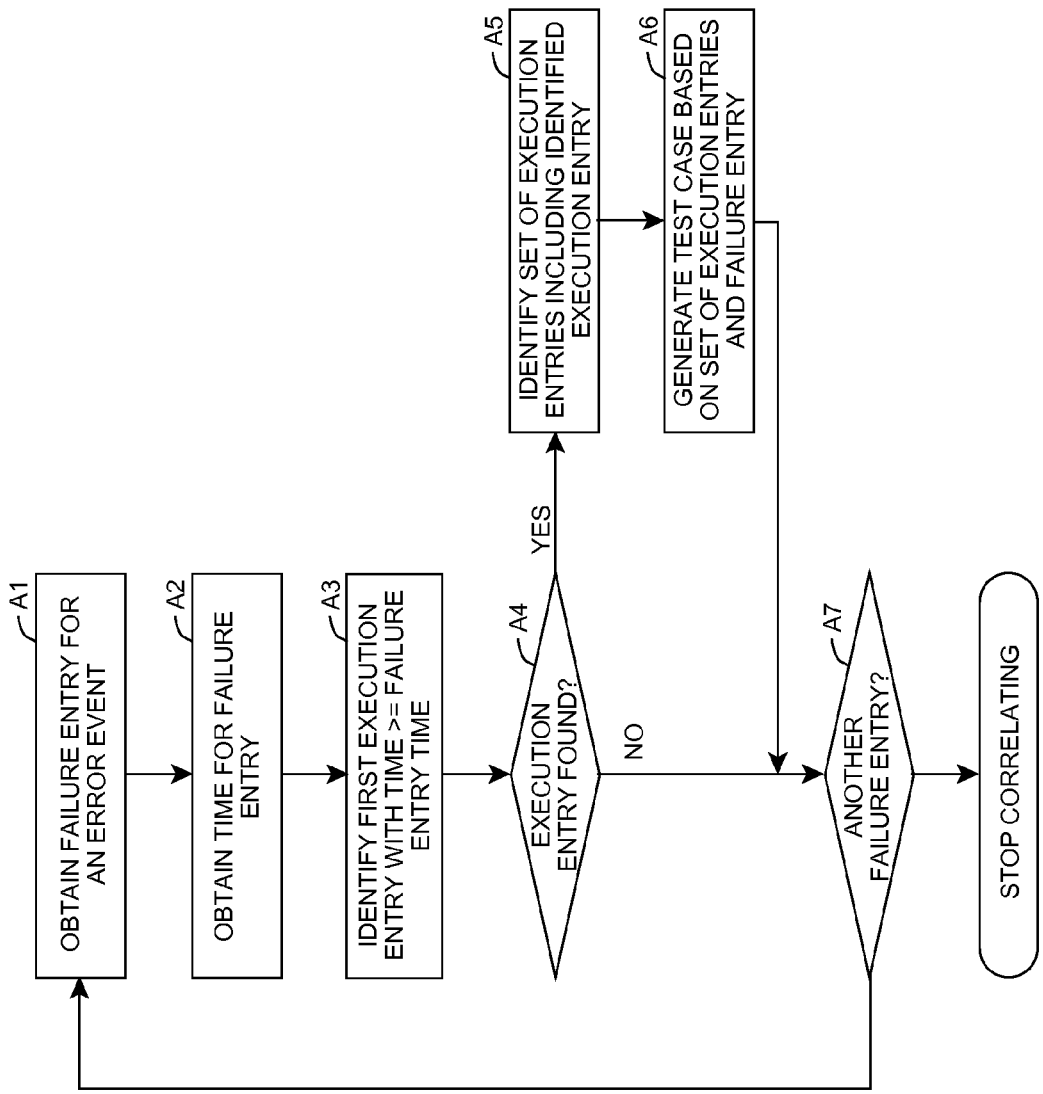

CORRELATING MACRO AND ERROR DATA FOR DEBUGGING PROGRAM ERROR EVENT

FIELD OF THE INVENTION

Aspects of the invention relate generally to debugging a program, and more particularly, to a solution for storing and/or correlating macro data and error data to enable analysis of an error event.

BACKGROUND OF THE INVENTION

The occurrence of an error event (e.g., an application failure) during the execution of an application by an end-user is highly undesirable. In particular, such an occurrence will lead to reduced user satisfaction in the application, reduced user confidence in the vendor, and could lead to loss of data. As a result, it is highly desirable to extensively test an application during development to help reduce the likelihood of the occurrence of an error event after the application is released.

However, effectively testing an application can pose significant obstacles. In particular, it is often difficult to reproduce an error event. For example, the error event may occur after the user has been executing the application for a lengthy time period and performed numerous actions. In this case, the user may have a difficult time remembering all the steps to recreate the error event. Further, even when the user can reproduce the scenario, there may be only a particular set of actions used in a specific context that can generate the error event.

Several approaches seek to address the desire to recreate and/or analyze the execution of an application prior to the occurrence of an error event. For example, in several approaches, data on the application execution, such as Windows event notifications (Windows is a trademark of Microsoft Corporation in the United States, other countries, or both) is logged and used to play back user actions. Alternatively, several approaches log data on the code that was executed leading up to the error event. For example, an application can log error messages during execution. The logged data can include a time when the error event occurred, a stack trace, and/or some other information that locates a line of code that generated the error event as well as a series of function calls and/or the like that led up to the line of code being executed.

BRIEF SUMMARY OF THE INVENTION

Aspects of the invention provide a solution for managing a program execution. During execution of a program, macro data and error data can be generated and stored. The macro data includes a set of execution entries, each of which includes data for a user interface task for a user interface object and a time for the user interface task. The error data, if any, includes a set of failure entries, each of which includes data for an error event and a time for the error event. A failure entry can be subsequently correlated with at least one execution entry based on the corresponding times. Further, relationship data and/or the like can be used to generate a test case, which can enable the user interface tasks that led up to the error event to be recreated.

A first aspect of the invention provides a method of managing a program execution, the method comprising: obtaining macro data for the program, the macro data including a set of execution entries, each of which includes data for a user interface task for a user interface object and a time for the user interface task; obtaining error data for the program, the error data including a set of failure entries, each failure entry including data for an error event and a time for the error event; and correlating at least one execution entry with a failure entry based on the time for the at least one execution entry and the time for the failure entry.

A second aspect of the invention provides a system for managing a program execution, the system comprising: a system for obtaining macro data for a program, the macro data including a set of execution entries, each of which includes data for a user interface task for a user interface object and a time for the user interface task; a system for obtaining error data for the program, the error data including a set of failure entries, each failure entry including data for an error event and a time for the error event; and a system for correlating at least one execution entry with a failure entry based on the time for the at least one execution entry and the time for the failure entry.

A third aspect of the invention provides a computer program comprising program code stored on at least one computer-readable medium, which when executed, enables a computer system to implement a method of managing a program execution, the method comprising: obtaining macro data for the program, the macro data including a set of execution entries, each of which includes data for a user interface task for a user interface object and a time for the user interface task; obtaining error data for the program, the error data including a set of failure entries, each failure entry including data for an error event and a time for the error event; and correlating at least one execution entry with a failure entry based on the time for the at least one execution entry and the time for the failure entry.

A fourth aspect of the invention provides a method of generating a system for managing a program execution, the method comprising: providing a computer system operable to: obtain macro data for the program, the macro data including a set of execution entries, each of which includes data for a user interface task for a user interface object and a time for the user interface task; obtain error data for the program, the error data including a set of failure entries, each failure entry including data for an error event and a time for the error event; and correlate at least one execution entry with a failure entry based on the time for the at least one execution entry and the time for the failure entry.

A fifth aspect of the invention provides a method of monitoring a program execution, the method comprising: identifying execution of a user interface task for a user interface object of an program; storing an execution entry as macro data for the executed user interface task, the execution entry including data for the user interface task and a time for the user interface task; identifying an error event during the program execution; and storing a failure entry as error data for the error event, the failure entry including data for the error event and a time for the error event.

A sixth aspect of the invention provides a system for monitoring a program execution, the system comprising: a system for identifying execution of a user interface task for a user interface object of an program; a system for storing an execution entry as macro data for the executed user interface task, the execution entry including data for the user interface task and a time for the user interface task; a system for identifying an error event during the program execution; and a system for storing a failure entry as error data for the error event, the failure entry including data for the error event and a time for the error event.

A seventh aspect of the invention provides a computer program comprising program code stored on at least one computer-readable medium, which when executed, enables a computer system to implement a method of monitoring a program execution, the method comprising: identifying execution of a user interface task for a user interface object of an program; storing an execution entry as macro data for the executed user interface task, the execution entry including data for the user interface task and a time for the user interface task; identifying an error event during the program execution; and storing a failure entry as error data for the error event, the failure entry including data for the error event and a time for the error event.

An eighth aspect of the invention provides a method of generating a system for monitoring a program execution, the method comprising: providing a computer system operable to: identify execution of a user interface task for a user interface object of an program; store an execution entry as macro data for the executed user interface task, the execution entry including data for the user interface task and a time for the user interface task; identify an error event during the program execution; and store a failure entry as error data for the error event, the failure entry including data for the error event and a time for the error event.

A ninth aspect of the invention provides a business method for managing one or more aspects of the execution of a target program, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

FIG. 2 shows an illustrative flow diagram, which can be implemented by the target program of FIG. 1 according to an embodiment of the invention.

FIG. 3 shows an illustrative group of user interface objects, macro data, and error data, which can be generated during execution of the target program of FIG. 1 according to an embodiment of the invention.

FIG. 4 shows an illustrative flow diagram, which can be implemented by the analysis program of FIG. 1 according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
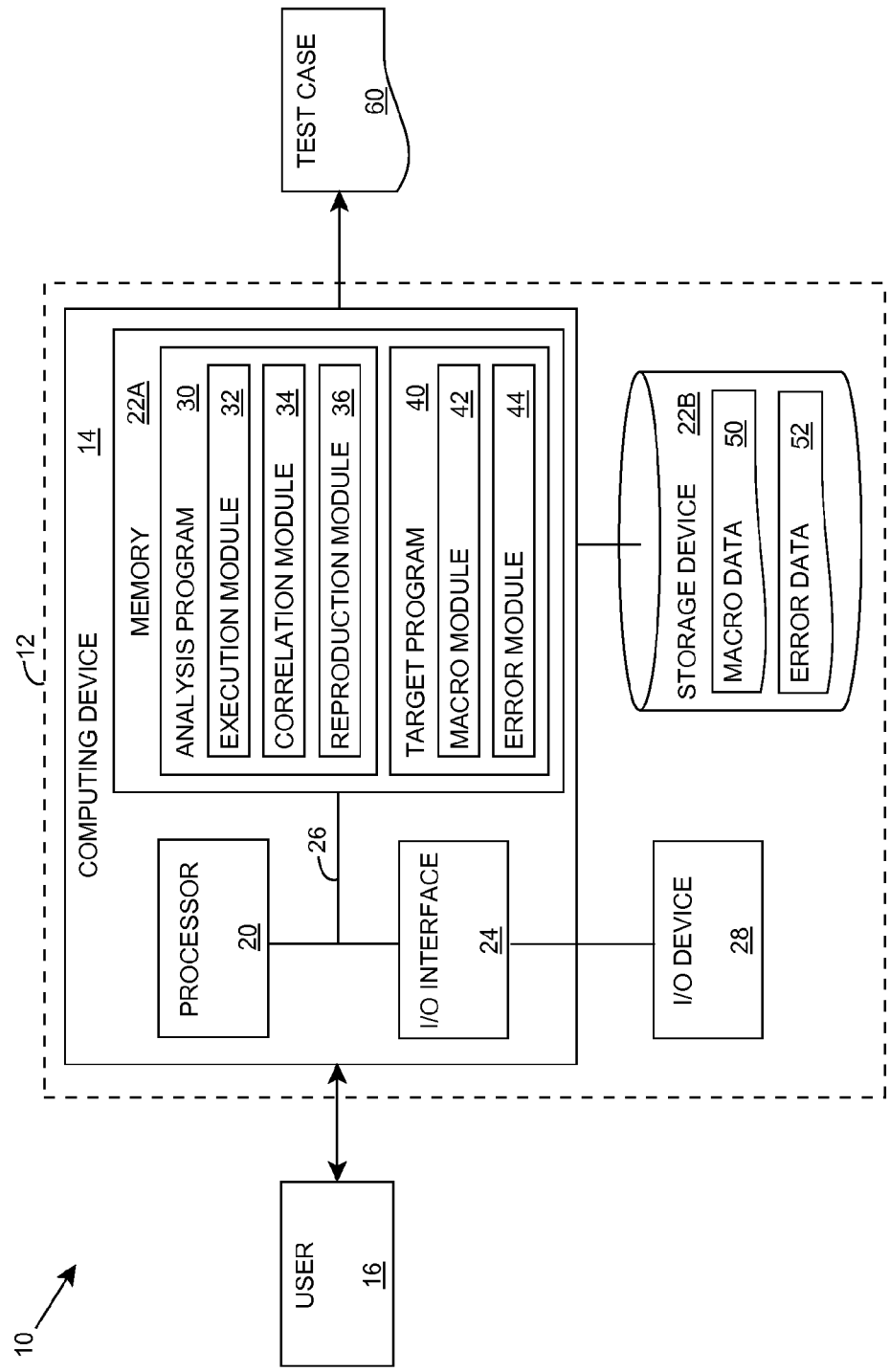
FIG. 1 shows an illustrative environment for generating a test case based on the execution of a target program according to an embodiment of the invention.

As indicated above, aspects of the invention provide a solution for managing a program execution. During execution of a program, macro data and error data can be generated and stored. The macro data includes a set of execution entries, each of which includes data for a user interface task for a user interface object and a time for the user interface task. The error data, if any, includes a set of failure entries, each of which includes data for an error event and a time for the error event. A failure entry can be subsequently correlated with at least one execution entry based on the corresponding times. Further, relationship data and/or the like can be used to generate a test case, which can enable the user interface tasks that led up to the error event to be recreated. As used herein, unless otherwise noted, the term "set" means one or more (i.e., at least one) and the phrase "any solution" means any now known or later developed solution.

Turning to the drawings, FIG. 1 shows an illustrative environment 10 for generating a test case 60 based on the execution of a target program 40 according to an embodiment of the invention. To this extent, environment 10 includes a computer system 12 that can perform the process described herein in order to generate test case 60. In particular, computer system 12 is shown including a computing device 14 that comprises an analysis program 30, which makes computing device 14 operable to generate test case 60 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as target program 40, which is stored on at least one computer-readable medium, such as memory 22A and/or storage device 22B. While executing program code, processor 20 can read and/or write data, such as test case 60, to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user 16 to communicate with computing device 14 using any type of communications link.

In any event, computing device 14 can comprise any general purpose computing article of manufacture capable of executing program code installed thereon. However, it is understood that computing device 14 and analysis program 30 are only representative of various possible equivalent computing devices that may perform the process described herein. To this extent, in other embodiments, the functionality provided by computing device 14 and analysis program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 (e.g., user 16) using any type of communications link. In either case, the communications link can comprise any combination of various types of wired and/or wireless links; comprise any combination of one or more types of networks; and/or utilize any combination of various types of transmission techniques and protocols.

As discussed herein, analysis program 30 enables computer system 12 to generate test case 60 based on an execution of target program 40. To this extent, analysis program 30 is shown including an execution module 32, a correlation module 34, and a reproduction module 36. Additionally, target program 40 is shown including a macro module 42 and an error module 44. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for monitoring an application execution, e.g., the execution of target program 40 by computer system 12. For example, in an embodiment of the invention, during execution, target program 40 can perform one or more user interface tasks, and generate and store macro data 50 for each user interface task performed. Additionally, target program 40 can generate and store error data 52 when an error event occurs during its execution.

To this extent, FIG. 2 shows an illustrative flow diagram, which can be implemented by target program 40 (FIG. 1) according to an embodiment of the invention. Referring to FIGS. 1 and 2, in process E1, target program 40 executes on computer system 12. During execution, target program 40 can execute a user interface task for a user interface object in response to some input from user 16. In general, a user interface task comprises any processing performed by target program 40 in response to input received from a user 16, and a user interface object comprises any object generated and/or defined by target program 40 that enables user 16 to provide input and/or receive output. To this extent, the input can be received using any solution.

When user 16 comprises an individual, illustrative inputs include, for example, keyboard input, mouse movement/button press(es), verbal command, and/or the like. In this case, illustrative user interface objects include a window (e.g., application window, dialog box, wizard, etc.), user interface control(s) in a window (e.g., button, menu, radio button, check box, list, text box, etc.), and/or the like. Additionally, user interface tasks can include, for example, generating and/or closing a window, one or more actions performed in response to an event for a user interface object (e.g., window resize/move, button click, menu selection, radio button/check box selection, list selection(s), text entry/deletion, etc.), and/or the like.

User 16 also can comprise another system/program. In this case, illustrative inputs include a function call, a data query/update, and/or the like. To this extent, illustrative user interface objects for a system user include function(s)/message(s) defined in an Application Program Interface (API), a database, an exposed object/object interface, and/or the like. Further, illustrative user interface tasks include processing a function, performing a data query/update, and/or the like.

FIG. 3 shows an illustrative group of user interface objects, which can be generated during execution of target program 40 (FIG. 1) according to an embodiment of the invention. Referring to FIGS. 1-3, in general, target program 40 can generate a first window 54, which can include a button that enables user 16 (FIG. 1) to request the generation of a dialog. When user 16 activates the button, target program 40 can generate dialog 56. As illustrated, dialog 56 can include multiple pages, each of which can include one or more additional user interface objects (e.g., TABLE 1). Additionally, dialog 56 is shown including a CANCEL button and an APPLY button.

While target program 40 is executing, in decision E2, macro module 42 can identify the execution of a user interface task for a user interface object of target program 40. Macro module 42 can identify the execution using any solution. For example, macro module 42 can monitor operating system events (e.g., Windows event notifications), user 16 input/output, and/or the like. When macro module 42 identifies the execution of a user interface task, in process E3, macro module 42 can generate and store an execution entry as macro data 50 based on the executed user interface task. For example, when dialog 56 is presented to user 16, user 16 can selectively make one of the pages (e.g., PAGE2) visible, interact with the corresponding one or more user interface objects for the visible page (e.g., TABLE 1), and/or the like. For each of these actions, macro module 42 can generate and store an execution entry as macro data 50.

To this extent, macro module 42 can generate and store macro data 50 based on the interaction of user 16 with windows 54, 56 and the corresponding user interface actions performed by target program 40. As illustrated in FIG. 3, an execution entry in macro data 50 can include a unique identifier for the execution entry (e.g., MACRO1), data identifying (e.g., uniquely) the user interface task that was executed by target program 40 (e.g., DIALOG1), an approximate time at which the user interface task was executed (e.g., TIME1), data regarding the user interface task (e.g., VALUE=6), and/or the like. To this extent, an execution entry can include sufficient data to enable the user interface task to be recreated in addition to a time that the user interface task occurred.

Macro data 50 and each corresponding execution entry, can be stored using any solution (e.g., one or more data files, relational database, and/or the like). In an embodiment of the invention, the set of execution entries include human-useable data for enabling a user, such as user 16, to view details on the user interface task and/or recreate the user interface task. In another embodiment of the invention, the set of execution entries include machine-useable data for enabling the user interface task to be automatically recreated and/or analyzed (e.g., by another system). Further, it is understood that an execution entry can include any combination of human-useable and/or machine-useable data. Still further, it is understood that macro module 42 can write one data format (e.g., machine-useable data) while target program 40 is executing, which macro module 42 and/or another system can translate to another data format (e.g., human-useable data) in the background and/or after execution of target program 40.

User interface objects can be related to one another. For example, dialog 56 includes several user interface objects within it (e.g., pages PAGE1-4, CANCEL button, APPLY button). To this extent, an execution entry also can include relationship data that defines a relationship between the corresponding user interface object and a user interface object of another execution entry in macro data 50. Macro module 42 can generate and store the relationship data in the execution entry using any machine-useable and/or human-useable solution. For example, each execution entry in macro data 50 is shown including a corresponding indentation level to indicate a relationship between multiple user interface controls (e.g., a child user interface object being "nested" under parent user interface object(s)). In particular, an execution entry for PAGE2 is indented under an execution entry for DIALOG1 56, and likewise, an execution entry for TABLE1 is indented under the execution entry for PAGE2. Further, an identification of a user interface object can include identification(s) of one or more parent user interface objects (e.g., TABLE1.ENTRY1 can indicate that ENTRY1 is a child of TABLE1). Regardless, it is understood that these solutions are only illustrative.

During execution of target program 40 in process E1, one or more error events may occur. In this case, target program 40 can store error data 52 for an error event that occurs during execution. An error event can comprise any type of application failure/exception. In general, an error event occurs when program code executing in target program 40 processes invalid data and/or is initiated incorrectly. To this extent, the error event can be caused by user 16 performing an unexpected action for which target program 40 was not properly programmed to prevent/handle, incorrect programming in target program 40, and/or the like. For example, the error event can comprise data that is not initialized, data that is unexpectedly unavailable, data having an invalid value, and/or the like. Further, an error event can comprise an attempt to access an invalid memory location, a memory overflow, and/or the like. To this extent, an error event may cause target program 40 to terminate, may result in incorrect/meaningless data being displayed on a user interface, and/or the like.

In any event, in decision E4, error module 44 can identify an occurrence of an error event while target program 40 is executing. Error module 44 can identify the occurrence using any solution. For example, error module 44 can detect an operating system exception. Further, user 16 could identify the occurrence of an error event for error module 44 (e.g., when meaningless data is provided). Still further, error module 44 can include debug program code or the like, which captures and generates data on various types of error events.

When error module 44 identifies an error event, in process E5, error module 44 can generate and store a failure entry as error data 52 for the error event. As illustrated in FIG. 3, the failure entry can include a unique identifier for the failure entry (e.g., ERROR3), data identifying (e.g., uniquely) the error event (e.g., ERRORNAME), an approximate time at which the error event occurred/was identified (e.g., TIME5), data on the execution state of target program 40 (e.g., STACK), and/or the like. It is understood that, as with an execution entry, a failure entry can include any combination of human-useable and/or machine-useable data to facilitate human and/or automated analysis of the error event, which can be stored using any solution (e.g., one or more data files).

Regardless, in decision E6, target program 40 can determine whether to continue executing, and if so, return to process E1. Execution of target program 40 can terminate due to a request from user 16, an unrecoverable error event, and/or the like. In any event, it is understood that the flow diagram of FIG. 2 is only illustrative. To this extent, it is understood that the various decisions/processes can occur in any order, including in parallel. The flow diagram of FIG. 2 is merely presented to convey a conceptual view of the execution of target program 40.

Additionally, it is understood that target program 40 and macro module 42 and error module 44 are only illustrative of various embodiments that can monitor the execution of an application by computer system 12. For example, in an embodiment of the invention, the functionality provided by macro module 42 and/or error module 44 can be implemented apart from and/or as a "plug-in" for target program 40. To this extent, module(s) 42, 44 can be provided separately from target program 40 and can operate independent of any functionality of target program 40. Additionally, it is understood that macro data 50 and/or error data 52 can include any window of execution data for target program 40. For example, data 50, 52 can be limited to a maximum number of entries, a maximum size, and/or the like. Further, data 50, 52 can be cleared upon each execution of target program 40, upon the return to a particular location within target program 40, upon a request from a user 16, and/or the like. Various alternatives are possible under the invention, each of which may be appropriate depending on the nature of target program 40.

Returning to FIG. 1, analysis program 30 can manage the execution of target program 40 using any solution. For example, analysis program 30 can be included as part of a testing and/or development environment for target program 40 and execution module 32 can enable the execution of target program 40 in a development mode. In this case, during execution in development mode, execution module 32 can enable a developer (e.g., user 16) to temporarily halt execution of target program 40, monitor one or more data values during execution, generate data regarding the execution, and/or the like. To this extent, execution module 32 can manage the generation and storage of macro data 50 and/or error data 52. For example, execution module 32 can delete old data 50 and/or 52, enable/disable its generation, adjust the content of data 50 and/or 52, and/or the like.

Additional aspects of the invention provide a solution for correlating macro data 50 with error data 52. To this extent, correlation module 34 can correlate a failure entry in error data 52 with at least one execution entry in macro data 50. In particular, after the generation of macro data 50 and error data 52 during execution of target program 40, correlation module 34 can obtain macro data 50 and error data 52 using any solution. For example, user 16 can identify the data 50, 52 using a user interface generated by correlation module 34, another system/module can communicate the location of and/or a copy of data 50, 52 using an application program interface (API), data 50, 52 may be located in a designated location, and/or the like.

In any event, correlation module 34 can attempt to correlate a failure entry in error data 52 with at least one execution entry in macro data 50. To this extent, FIG. 4 shows an illustrative flow diagram, which can be implemented by correlation module 34 (FIG. 1) according to an embodiment of the invention. Referring to FIGS. 1 and 4, in process A1, correlation module 34 obtains a failure entry for an error event from error data 52 for processing using any solution. For example, correlation module 34 can obtain the failure entry having the lowest time in error data 52, and which has not been processed, obtain the failure entry for a designated error event, and/or the like.

Correlation module 34 can attempt to correlate the failure entry with one or more execution entries in macro data 50 based on the corresponding times. To this extent, in process A2, correlation module 34 obtains the time for the failure entry. In process A3, correlation module 34 attempts to identify the first execution entry in macro data 52 having a corresponding time that is greater than or equal to the time for the failure entry. In general, for the execution entry to correlate with the failure entry the two times should be equal or relatively close (e.g., within a few seconds). To this extent, correlation module 34 can use a time window (e.g., ten seconds) to identify an execution entry that is correlated with the failure entry. In this case, correlation module 34 will not identify an execution entry that has a time much greater than the failure entry as being correlated with the failure entry.

In decision A4, correlation module 34 determines whether an execution entry in macro data 50 having a time that correlates with the time of the failure entry in error data 52 was found. If so, in process A5, correlation module 34 identifies a set of execution entries, which includes the identified execution entry, that are correlated with the failure entry. To this extent, correlation module 34 can go back and/or forward in macro data 50 to identify those execution entries that include user interface actions that are related to the identified execution entry. Correlation module 34 can use any solution to determine the relatedness between user interface actions. In particular, correlation module 34 can identify all user interface actions that were performed from the start of an execution of target program 40, all user interface actions that were performed after a designated user interface action, and/or the like. For example, turning briefly to FIG. 3, ERROR3 in error data 52 could be initially identified as being correlated with MACRO5 in macro data 50. Subsequently, a group of related execution entries MACRO1-5 can be correlated with ERROR3 since these are all of the user interface actions that were performed with respect to dialog 56.

Returning to FIGS. 1 and 4, analysis program 30 can enable the debugging of target program 40 based on the set of execution entries correlated with the failure entry. For example, correlation module 34 can provide data on the failure entry and the correlated set of execution entries for presentation to user 16. User 16 can use the data to identify a location in the source code for target program 40 where a software bug may be present, identify additional data to generate/monitor during a subsequent execution (e.g., in development mode), and/or the like.

Additionally, in process A6, correlation module 34 can generate a test case 60 based on the correlated set of execution entries and failure entry. For example, correlation module 34 can store data from the set of execution entries and/or the failure entry in a file, which can be used to reproduce the corresponding user interface tasks. Test case 60 can include any combination of data, which can be stored using any solution. For example, test case 60 can include sufficient data to recreate each user interface task, data on the timing of each user interface task (e.g., difference in time between the executions), data on the state of target program 40, and/or the like. In any event, correlation module 34 can store test case 60 for future reference and/or processing. In decision A7, correlation module 34 can determine whether another failure entry in error data 52 is to be processed, and if so, execution returns to process A1. Otherwise, correlation module 34 can stop correlating macro data 50 and error data 52.

Reproduction module 36 can enable the use of test case 60 in debugging target program 40 and/or reproducing the error event. For example, reproduction module 36 can provide test case 60 for presentation to user 16. User 16 can view test case 60 to identify a location in the source code for target program 40, which may include a software bug. Additionally, user 16 can view test case 60 to reproduce the set of user interface actions that previously led up to the error event. Still further, reproduction module 36 can process test case 60 to automatically reproduce the set of user interface actions that previously led up to the error event. To this extent, test case 60 can include any combination of human-useable and/or machine-useable data to facilitate the display of a set of user interface actions to a user 16 and/or the automatic reproduction of the set of user interface actions by a system, such as computer system 12.

While shown and described herein as a method and system for managing one or more of various aspects of the execution of a target program, it is understood that the invention further provides various alternative embodiments. For example, in one embodiment, the invention provides a computer program stored on a computer-readable medium, which when executed, enables a computer system to manage one or more of various aspects of the execution of a target program. To this extent, the computer-readable medium includes program code, such as analysis program 30, macro module 42, and/or error module 44, which implements the process described herein. It is understood that the term "computer-readable medium" comprises one or more of any type of tangible medium of expression capable of embodying all or a portion of a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing one or more of various aspects of the execution of a target program. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to manage one or more of various aspects of the execution of a target program as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing a program execution, wherein the computer performs the steps of:
   obtaining macro data for the program, the macro data including a set of execution entries, each of which includes data corresponding to a user interface task executed by the program for a user interface object of the program and a time corresponding to execution of the user interface task, wherein the user interface task comprises user level processing performed in response to an input received from a user using the user interface object and wherein the data corresponding to the user interface task enables recreation of the user interface task;

obtaining error data for the program, the error data including a set of failure entries, each failure entry including data for an error event and a time for the error event; and correlating at least one execution entry with a failure entry based on the time for the at least one execution entry and the time for the failure entry.

2. The method of claim 1, further comprising generating a test case based on the correlated at least one execution entry and the failure entry.

3. The method of claim 2, further comprising automatically reproducing the at least one user interface task using the test case.

4. The method of claim 2, further comprising providing the at least one execution entry for presentation to a user using the test case.

5. The method of claim 1, further comprising debugging the program based on the correlating.

6. The method of claim 1, the obtaining macro data including:
    identifying execution of a user interface task for a user interface object of the program;
    generating an execution entry based on the executed user interface task; and
    storing the execution entry as macro data for the program.

7. The method of claim 1, the obtaining error data including:
    identifying an error event during the program execution;
    generating a failure entry based on the identified error event; and
    storing the failure entry as error data for the program.

8. A computer system for managing a program execution, the computer system comprising:
    a device for obtaining macro data for a program, the macro data including a set of execution entries, each of which includes data corresponding to a user interface task executed by the program for a user interface object of the program and a time corresponding to execution of the user interface task, wherein the user interface task comprises user level processing performed in response to an input received from a user using the user interface object and wherein the data corresponding to the user interface task enables recreation of the user interface task;
    a device for obtaining error data for the program, the error data including a set of failure entries, each failure entry including data for an error event and a time for the error event; and
    a device for correlating at least one execution entry with a failure entry based on the time for the at least one execution entry and the time for the failure entry.

9. The computer system of claim 8, further comprising a device for generating a test case based on the correlated at least one execution entry and the failure entry.

10. The computer system of claim 8, further comprising a device for debugging the program based on the correlating.

11. A computer program comprising program code stored on at least one computer-readable storage medium, which when executed, enables a computer system to implement a method of managing a program execution, the method comprising:

obtaining macro data for the program, the macro data including a set of execution entries, each of which includes data corresponding to a user interface task executed by the program for a user interface object of the program and a time corresponding to execution of the user interface task, wherein the user interface task comprises user level processing performed in response to an input received from a user using the user interface object and wherein the data corresponding to the user interface task enables recreation of the user interface task;

obtaining error data for the program, the error data including a set of failure entries, each failure entry including data for an error event and a time for the error event; and correlating at least one execution entry with a failure entry based on the time for the at least one execution entry and the time for the failure entry.

12. The computer program of claim 11, the method further comprising generating a test case based on the correlated at least one execution entry and the failure entry.

13. The computer program of claim 12, the method further comprising automatically reproducing the at least one user interface task using the test case.

14. The computer program of claim 12, the method further comprising providing the at least one execution entry for presentation to a user using the test case.

15. The computer program of claim 11, the method further comprising debugging the program based on the correlating.

16. A computer program comprising program code stored on at least one computer-readable storage medium, which when executed, enables a computer system to implement a method of monitoring a program execution, the method comprising:
    identifying execution of a user interface task for a user interface object of the program;
    storing an execution entry as macro data for the executed user interface task, the execution entry including data corresponding to the user interface task and a time corresponding to execution of the user interface task, wherein the user interface task comprises user level processing performed in response to an input received from a user using the user interface object and wherein the data corresponding to the user interface task enables recreation of the user interface task;
    identifying an error event during the program execution; and
    storing a failure entry as error data for the error event, the failure entry including data for the error event and a time for the error event.

17. The computer program of claim 16, the method further comprising:
    generating the user interface object for presentation to a user; and
    executing the user interface task for the user interface object.

18. The computer program of claim 16, the data for the user interface task including human-useable data for enabling a user to recreate the user interface task.

19. The computer program of claim 16, the data for the user interface task including machine-useable data for enabling an automated recreation of the user interface task.

20. The computer program of claim 16, the execution entry further including relationship data between the execution entry and a second execution entry in the macro data.

* * * * *